United States Patent [19]
Weir

[11] Patent Number: 5,464,675
[45] Date of Patent: Nov. 7, 1995

[54] ANEMOMETER FABRIC

[76] Inventor: Sam Weir, 3 Ocean Ave., Monmouth Beach, N.J. 07750

[21] Appl. No.: 204,505

[22] Filed: Mar. 1, 1994

[51] Int. Cl.$^6$ ....................................... B32B 3/14
[52] U.S. Cl. ............................ 428/78; 428/101; 428/124; 428/190; 73/170.05
[58] Field of Search ............................ 428/78, 101, 124, 428/190; 2/244, 243.1; 73/170.05, 170.07, 170.11; 116/265, 275, 273

[56] References Cited

U.S. PATENT DOCUMENTS 2,457,309  12/1948  Joyce ........................................ 2/244

Primary Examiner—Alexander S. Thomas
Attorney, Agent, or Firm—Michael W. Ferrell

[57] ABSTRACT

An anemometer fabric which changes appearance under aerodynamic stress is disclosed and claimed. The composite fabrics typically include a support fabric with a plurality of dual surfaced tabs overlaying the fabric. The tabs have different colors on each side and are secured so that an applied aerodynamic force will flip the tabs, thereby changing fabric color.

20 Claims, 3 Drawing Sheets

ANEMOMETER FABRIC

TECHNICAL FIELD

The present invention relates generally to fabrics and more specifically to a fabric responsive to an aerodynamic force such as wind, so that the fabric will change appearance under aerodynamic stress.

BACKGROUND OF INVENTION

Fashion has always been an important part of the clothing industry, indeed from the dawn of time. Color, geometric patterns, texture, water and wind resistance, protective properties, and other utilitarian aspects all potentially being important features of a particular garment. Egotistical involvement with one's apparel is likewise associated with clothing especially those items which denote membership in a particular organization or are identified with a hobby. For example, specialized clothing associated with a particular recreational activity such as bicycling, skiing, hunting, dance and the like has recently enjoyed significant commercial success. Such clothing frequently includes relatively specialized materials such as Spandex® elastomeric fabric, Gore-Tex® insulative materials, specialized polymer foams as well as reflective materials and materials of high modulus fiber such as Kevlar® polyaramide.

New materials and fabrics having unique features are constantly being developed both to stimulate and meet consumer demand.

SUMMARY OF THE INVENTION

The present invention is directed to an anemometer fabric which changes appearance under aerodynamic stress. Such fabrics are especially suitable for use in garments designed for bicycling, skiing, motorcycling, skydiving, bobsledding and such activities where a wearer will be exposed to significant wind speeds. Fabrics in accordance with the present invention are provided with a plurality of flaps or tabs that turn with applied stress, not unlike a paper tablet next to a fan.

BRIEF DESCRIPTION OF THE DRAWINGS

The invention is described in detail below in connection with numerous embodiments and illustrative figures in which.

DETAILED DESCRIPTION

Figure 1A:
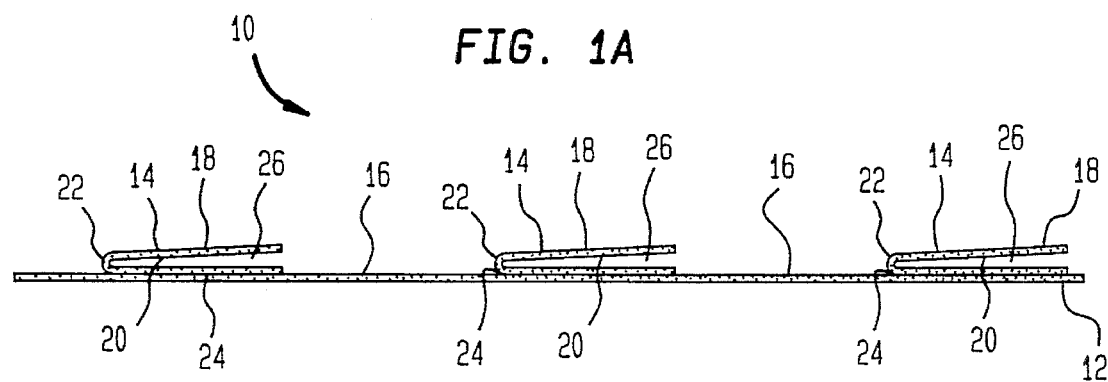
FIG. 1 (a–c) is a schematic showing side view of first embodiment of the fabric of the present invention under various conditions of aerodynamic stress.

The present invention is described in detail for purposes of illustration only. One of skill in the art will readily appreciate that the invention is generally directed to an anemometer fabric having a support fabric member including an outwardly facing upper surface provided with a plurality of dual surfaced fabric structures secured thereto defining a plurality of tabs overlaying the upper surface of the support fabric member. The tabs so defined have a first color on one side thereof and a second color on the other side thereof, the first color being distinct from the second color and facing outwardly in the absence of an aerodynamic force on the anemometer fabric so that the second color of the tabs are unexposed to a viewer. The tabs are secured such that an applied aerodynamic force urges the tabs to alter their spatial relationship with the support fabric member whereby the second color of the tabs is exposed to a viewer, altering the appearance of the anemometer fabric. As used herein the term "color" includes a pattern of colors. In other words, any surface having a distinct visual appearance based on chromatic properties.

In particular embodiments, the fabrics may be a woven fabric selected from the group consisting of nylon fabric, polyester fabric, cotton fabric, silk fabric, linen fabric, wool fabric and mixtures thereof.

In other embodiments, the fabrics include a polymer film, preferably selected from the group consisting of polyester, cellulose acetate, polyvinyl compounds such as polyethylene and polypropylene, natural rubbers, synthetic rubbers and mixtures thereof.

In still further embodiments, the dual fabric structures include a laminated member including a woven fabric layer and laminated thereto a polymer film layer wherein the woven fabric layer may be a woven fabric made of a material selected from the group consisting of nylon, polyester, cotton, silk, linen, wool and mixtures thereof. The polymer film may be made of a polymer selected from the group consisting of polyester, cellulose acetate, polyvinyl compounds such as polyethylene and polypropylene, natural rubbers, synthetic rubbers and mixtures thereof.

In more specific embodiments, an anemometer fabric in accordance with the present invention includes in combination a support fabric member including an outwardly facing upper surface, a plurality of dual surfaced fabric structures secured thereto where the fabric structures are fixedly secured to said support fabric member along a substantial portion of their length and unsecured along a substantial portion of their length thereby defining a plurality of tabs overlaying the upper surface of the support fabric member in a rest position. The tabs have a first color on one side thereof and a second color on the other side thereof, the first color being visually distinct from the second color and facing outwardly in the absence of an aerodynamic force on the anemometer fabric so that said second color unexposed to a viewer. At least one of the first and second colors are identical to the color of the outwardly facing upper surface of the support fabric member.

In still another specific embodiment, an anemometer fabric includes a support fabric member including an outwardly facing upper surface and a plurality of multilayered fabric structures secured thereto where the fabric structures include a plurality of tab layers in stacked relation to one another secured to the support fabric member along a substantial portion of their length and unsecured along a substantial portion of their length and being disposed so as to overlay the upper surface of the support fabric member in the absence of an aerodynamic force in a rest position. The tab layers have a first color on one said thereof and a second color on the other side thereof, the first color being visually distinct from the second color, and the first color facing outwardly in the rest position, while the second color is unexposed to a viewer in the absence of an applied aerodynamic force. The tab layers are constructed in a stacked geometry so as to be progressively responsive to an applied aerodynamic force whereby said anemometer fabric exhibits at least two appearances responsive to the application of a sufficient range of aerodynamic force.

Particular features of the present invention will be better understood by reference to the various figures and further description which appears hereafter.

Referring to FIG. 1, there is shown an anemometer fabric 10 including a support fabric 12 and a plurality of multi-surfaced tab structures 14. As noted above, the support fabric and tab structures may be made of any suitable material including fibers, films, and laminates thereof. Fabric 12 includes an upper surface 16, while tab structures 14 include an other surface 18 and an inner surface 20. In the embodiment shown in FIG. 1, surface 16 is identical in color to surface 18, grey in this instance while surface 20 is of a different color, red in this case. In a rest position, that is, in the absence of an aerodynamic force, the tab structures 14 are configured as shown in FIG. 1 (a). As shown, the structures are folded at 22 to be flat along the surface of support fabric 12. This may be achieved by thermoforming or any suitable means, including by two part construction if so desired. The important feature is that the tabs are urged flat by way of their inherent stiffness in the rest position to overlay the surface 16 of fabric 12 with only surfaces 16, 18 being exposed to view.

Thus, in the rest position fabric 10 has the appearance of being uniformly grey since only surfaces 16 and 18 are exposed for observation. Tab structures 14 are attached to fabric 12 along their entire lower length 24, and are otherwise unsecured to fabric 12. Thus, the tabs 14 are secured only to fold 22, along fifty percent of their length.

Figure 1B:
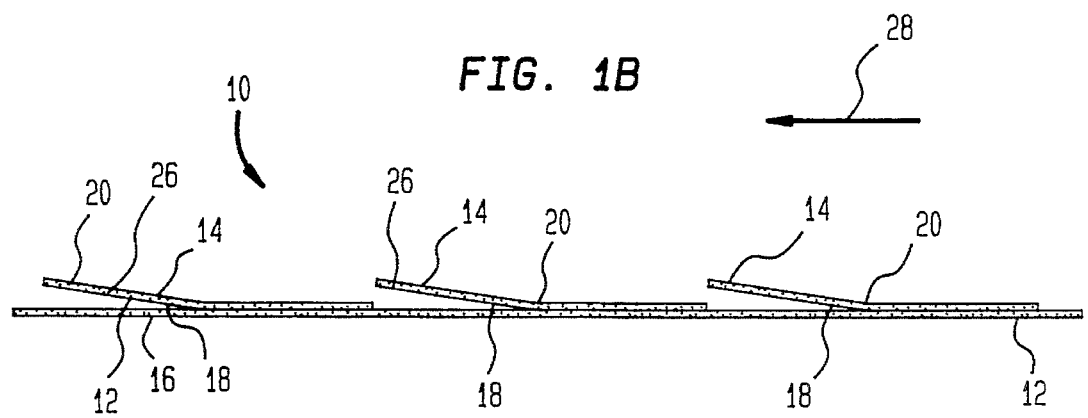

In the embodiment shown in FIG. 1, the distance between tab structures 14 is identical in length to the length of the upper portions 26 of the tab structures. The significance of this geometry is most apparent from FIG. 1(b). FIG. 1(b) illustrates fabric 10 under aerodynamic stress from wind having a vector component in the direction indicated by arrow 28. As shown, such stress urges tab structures 14 away from the rest position shown in FIG. 1(a) so that the tabs' spatial relationship with the support fabric 12 is altered.

Specifically, the tabs are urged 180° out of rest position so that only surfaces 20 are facing upwardly as shown. Thus fabric 10 is transformed from being uniformly grey in the absence of aerodynamic stress to being uniformly red under sufficient aerodynamic stress as shown in FIG. 1(b). fabric 10 is constructed to return to the rest geometry of FIG. 1(a) in the absence of stress due to elastic memory of the tab structure.

Figure 1C:
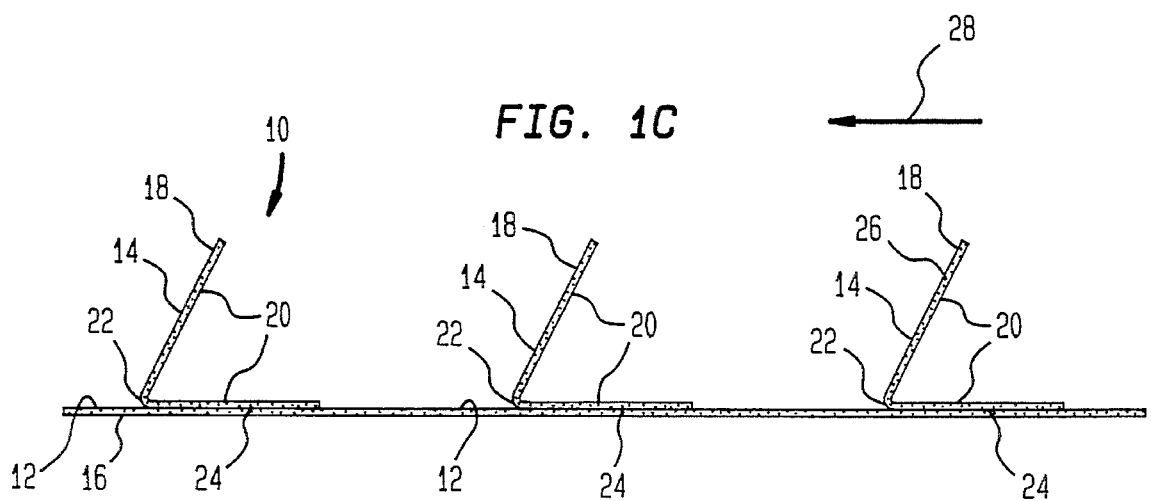

FIG. 1(c) illustrates a state intermediate the rest position of FIG. 1(a) and the fully open position of FIG. 1(b). One of skill will readily appreciate that thicknesses and materials can be selected so as to calibrate the fabric for wind force required to achieve the fully open position of FIG. 1(b). Less than such amount of wind may induce the state shown in FIG. 1(c) where inner surfaces 20 are partially observable to a viewer. At this angle, fabric 12 may appear striped in appearance.

Figure 2A:
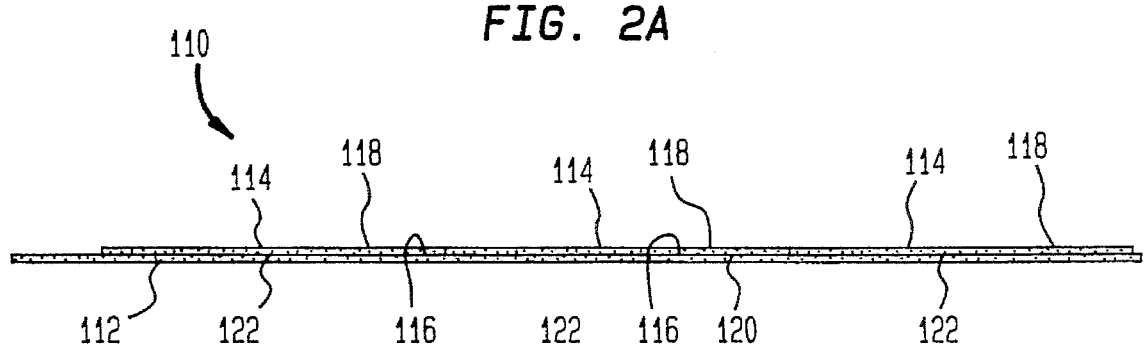
FIG. 2 (a–c) is a schematic showing a side view of a second embodiment of the fabric of the present invention under various conditions of aerodynamic stress.

Referring to FIG. 2, there is shown an alternate embodiment of an anemometer fabric 110 including a support fabric 112 and a plurality of tab forming members 114. As before, these components may be formed of any suitable synthetic or natural polymeric materials. Fabric 112 has an upper surface 116 of a first color, red in this instance. Tabs 114 have an outer surface 118 and an inner surface 120. Further, tabs 114 are secured along fifty percent of their length as generally shown at 122, and unsecured over fifty percent of their length as shown as well as being dimensioned to completely overlay the support fabric 112 in the rest position of FIG. 2(a), that is; in the absence of an aerodynamic force. The tabs may be secured by adhesive, sewn seams or another suitable means. In the embodiment of FIG. 2, surface 118 is grey while surface 120 is red. Thus, in the rest position of FIG. 2(a), fabric 110 appears grey to a viewer.

Figure 2B:
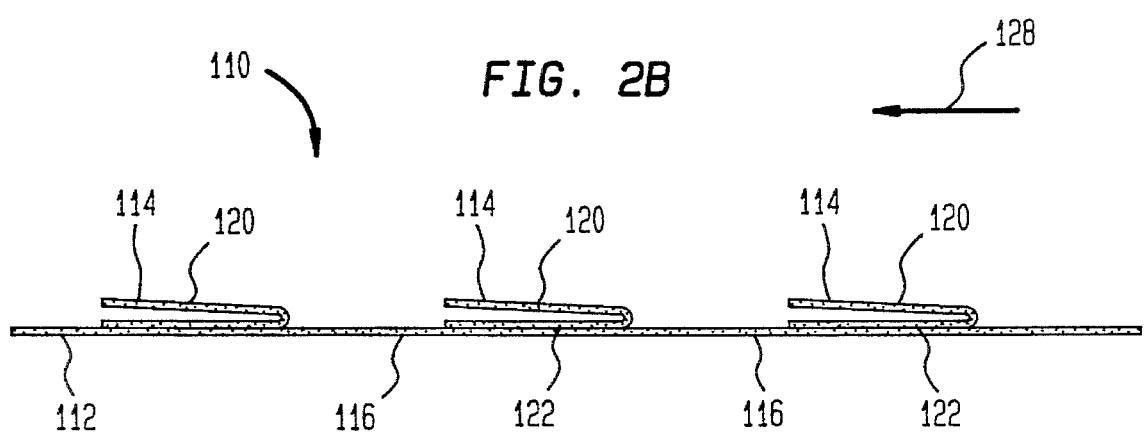

FIG. 2(b) shows fabric 110 under aerodynamic stress by way of a force having the direction shown by vector 128. Here, the stress is sufficient to completely fold back tabs 114 so that only surfaces 120, 116 are exposed to a viewer. Since both surfaces are red, the fabric has completely changed color. Again, when the stress is removed, fabric 110 returns to the rest position of FIG. 2(a) and the fabric is uniformly grey.

Figure 2C:
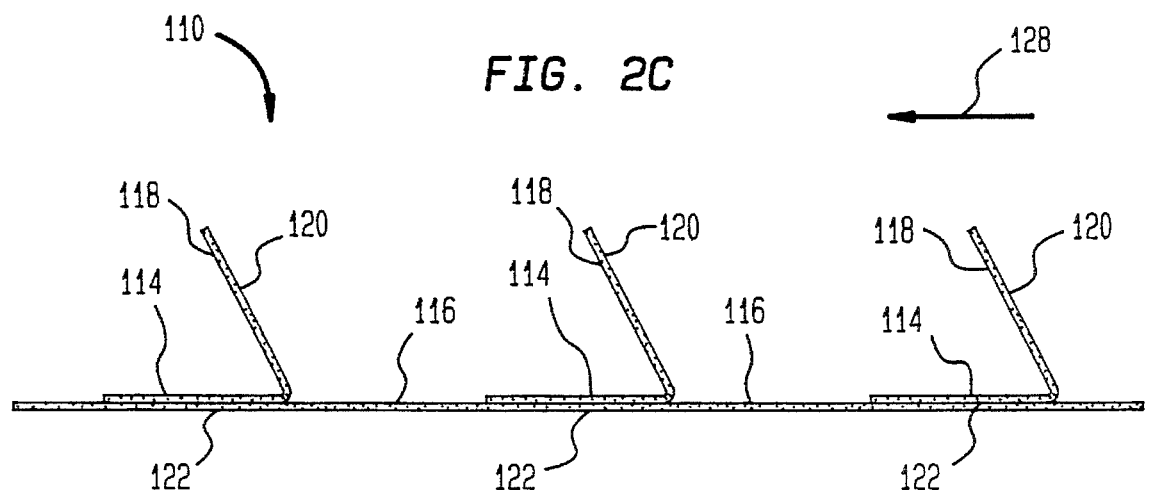

As discussed in connection with FIG. 1, if the aerodynamic force indicated by arrow 128 is insufficient to completely fold back the tabs, an intermediate state such as that shown in FIG. 2(c) may be achieved. Here also appearance of the fabric may be striped in nature, depending upon viewing angle.

Figure 3:
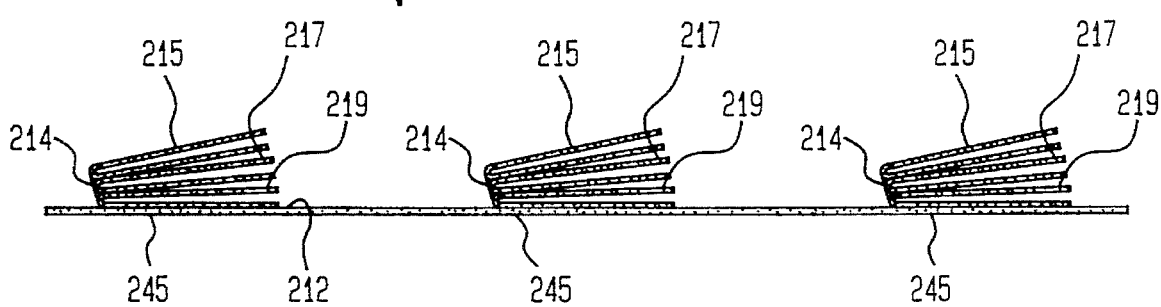
FIG. 3 is a schematic showing a side view of a third embodiment of the fabric of the present invention.

One of skill in the art will readily appreciate that multi-layer tab structures may be employed in connection with the present invention as shown schematically in FIG. 3. In such cases, it is preferred to choose materials, so that an anemometer fabric 210 is progressively responsive to wind speeds, that is, exhibits a first appearance at a rest position, another appearance at a first level of applied aerodynamic force and yet another appearance at a second level of applied aerodynamic force. This may be achieved with a support fabric 212 of a first color and secured thereto along a significant portion of their length 245 a plurality of stacked tab structures 214. Structures 214 each have a plurality of tab members 215, 217, 219 with inner and outer surfaces as discussed earlier having distinct colors. Tab members 215 are of lower modulus (stiffness) than members 217, which in turn are of lower modulus (stiffness) than members 219. Thus members 215 will respond to a lower force than members 217 which will respond to less force then members 319. Another way to calibrate tabs may be to increase width, which may alter the force necessary to bend the tab, depending upon specific geometry.

FIGS. 1 through 3 have shown various embodiments of the present invention in side view, that is, along a direction wherein the length of a particular tab is shown. The length and stiffness of the tab will affect aerodynamic response, as will the width of a tab, as will readily be appreciated by one of skill in the art.

The tabs must be sufficiently short in length so that the natural curvature of the body does not impede the turning of the tabs. Tabs on arms and legs are shorter than tabs on chest and back.

A suit of anemometer fabric for a specific sport can be calibrated for a classical position of that sport in bending tab moment and tab direction of leading edge. For example: A snow boarder in his one arm forward sidewards stance would have all the tabs facing forward in that position. A regular skier in his classical forward facing two hands forward position would have all tabs facing forward in that position. The bending moment of the tabs would lessen as relative surface wind speed lessened according to different positions on the body. In this manner all or nearly all of the tabs would turn in unison at a specific speed.

Figure 4A:
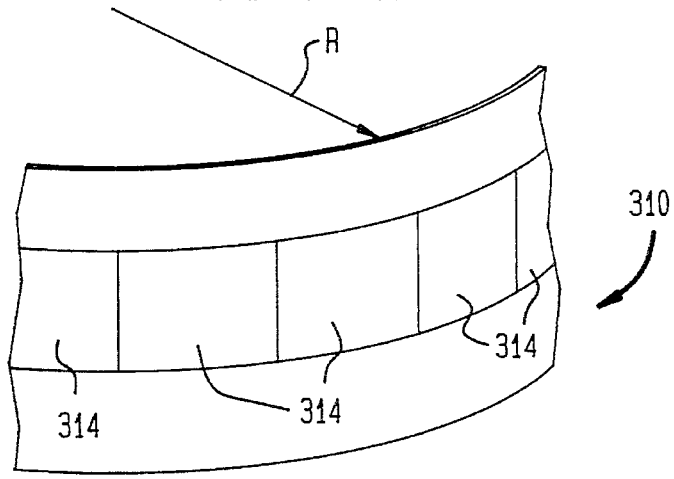
FIG. 4 (a,b) is a schematic diagram showing the dependence of tab width on radius of curvature.
Figure 4B:
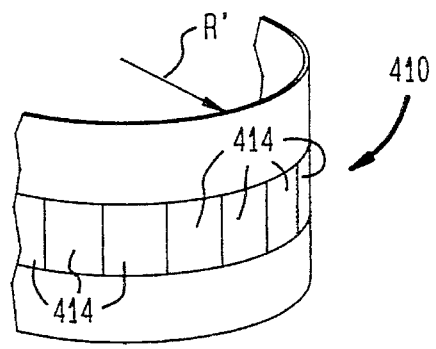

The relationship of tab width to radius of curvature is illustrated by way of reference to FIGS. 4a and 4b. There is shown in FIG. 4a a portion of a garment 310 with a relatively large radius of curvature, R, as might be suitable for the torso. As may be seen, tabs 314 are relatively wide at this curvature for a given wind speed. On the other hand, FIG. 4b shows a portion of a garment 410 with a relatively short radius of curvature, R', as may be suitable for an arm. As shown in FIG. 4b, the width of tabs 414 is smaller than corresponding tabs 314.

Still further embodiments of the present invention are readily fabricated, all of which are within the spirit and scope of the appended claims.

What is claimed:

1. An anemometer fabric comprising in combination:

a support fabric member including an outwardly facing upper surface;

at least three dual surfaced fabric structures secured to said fabric member defining at least first, second and third side by side tabs overlaying said upper surface of said support fabric member;

said tabs being displaceable in a single direction in response to an applied aerodynamic force and being arranged such that said second tab is between said first and third tabs so that said second tab isolates said first tab from said third tab;

said tabs having a first color on one side thereof and a second color on the other side thereof, said first color being distinct from said second color and facing outwardly in the absence of an aerodynamic force on said anemometer fabric so that said second color of said tabs is unexposed to a viewer; and wherein said tabs are secured such that an applied aerodynamic force urges said tabs to alter their spatial relationship with said support fabric member whereby said second color of said tabs is exposed to a viewer, thereby altering the appearance of said anemometer fabric.

2. The fabric according to claim 1, wherein said support fabric member comprises a woven fabric selected from the group consisting of nylon fabric, polyester fabric, cotton fabric, silk fabric, linen fabric, wool fabric and mixtures thereof.

3. The fabric according to claim 1, wherein said dual surfaced fabric structures include a polymer film.

4. The fabric according to claim 3 wherein said polymer is polyethylene or polypropylene.

5. The fabric according to claim 3, wherein said polymer is selected from the group consisting of polyester, cellulose acetate, polyvinyl compounds, natural rubbers, synthetic rubbers and mixtures thereof.

6. The fabric according to claim 1, wherein said dual surfaced fabric structures include a laminated member including a woven fabric layer and laminated thereto a polymer film layer.

7. The fabric according to claim 6, wherein said woven fabric layer is a woven fabric made of a material selected from the group consisting of nylon, polyester, cotton, silk, linen, wool and mixtures thereof.

8. The fabric according to claim 1, wherein said first, second and third tabs define a continuous surface.

9. An anemometer fabric comprising in combination:

a support fabric member including an outwardly facing upper surface;

at least three dual surfaced fabric structures secured thereto;

said fabric structures being fixedly secured to said support fabric member along a substantial portion of their length and unsecured along a substantial portion of their length thereby defining at least first, second and third side by side tabs overlaying said upper surface of said support fabric member in a rest position, said tabs being displaceable in a single direction in response to an applied aerodynamic force and being arranged such that said second tab is between said first and third tabs so that said second tab isolates said first tab from said third tab;

said tabs having a first color on one side thereof and a second color on the other side thereof, said first color being visually distinct from said second color and facing outwardly in the absence of an aerodynamic force on said anemometer fabric so that said second color unexposed to a viewer;

at least one of said first and second colors being identical to the color of the outwardly facing upper surface of said support fabric member; and said fabric structures being constructed and arranged such that an applied aerodynamic force urges the tabs away from said rest position, thereby exposing said second color to a viewer, thereby altering the appearance of said anemometer fabric.

10. The fabric according to claim 9, wherein said support fabric member comprises a woven fabric selected from the group consisting of nylon fabric, polyester fabric, cotton fabric, silk fabric, linen fabric, wool fabric, and mixtures thereof.

11. The fabric according to claim 9, wherein said dual surfaced fabric structures include a polymer film.

12. The fabric according to claim 11 wherein said polymer is selected from the group consisting of polyester, cellulose acetate, polyvinyl compounds, natural rubbers, synthetic rubbers and mixtures thereof.

13. The fabric according to claim 9, wherein said dual surfaced fabric structures include a laminated member including a woven fabric layer and a laminated thereto a polymer film layer.

14. The fabric according to claim 13, wherein said woven fabric layer is a woven fabric made of a material selected from the group consisting of nylon, polyester, cotton, silk, linen, wool and mixtures thereof.

15. The fabric according to claim 9, wherein said first, second and third tabs define a continuous surface.

16. An anemometer fabric comprising in combination:

a support fabric member including an outwardly facing upper surface; and a plurality of multilayered fabric structures secured thereto;

said fabric structures including a plurality of tab layers in stacked relation to one another and being secured to said support fabric member along a substantial portion of their length and unsecured along a substantial portion of their length and being disposed so as to overlay said upper surface of said support fabric member in the absence of an aerodynamic force in a rest position, said tab layers having a first color on one said thereof and a second color on the other said thereof, said first color being visually distinct from said second color, said first color facing outwardly in said rest position and said second color being unexposed to a viewer in the absence of an applied aero-dynamic force, said tab layers being constructed so as to be progressively responsive to an applied aerodynamic force whereby said anemometer fabric exhibits at least two appearances responsive to the application of a sufficient range of aerodynamic force.

17. The fabric according to claim 16, wherein said support fabric member comprises a woven fabric selected from the group consisting of nylon fabric, polyester fabric, cotton fabric, silk fabric, linen fabric, wool fabric and mixtures thereof.

18. The fabric according to claim 16, wherein said multilayered fabric structures include a polymer film.

19. The fabric according to claim 16, wherein said multilayered fabric structures include a laminated member including a woven fabric layer and laminated thereto a polymer film layer.

20. The fabric according to claim 19, wherein said woven fabric layer is a woven fabric made of a material selected from the group consisting of nylon, polyester, cotton, silk, linen, wool and mixtures thereof.

* * * * *